(12) United States Patent  
Guest et al.

(10) Patent No.: US 7,472,822 B2
(45) Date of Patent: Jan. 6, 2009

(54) DELIVERY OF VALUE IDENTIFIERS USING SHORT MESSAGE SERVICE (SMS)

(75) Inventors: John David Guest, Hampshire (GB); Brian Roger Tagg, Hampshire (GB); Leslie George Lowin, West Sussex (GB)

(73) Assignee: e2Interactive, Inc., Atlanta, GA (US)

( * ) Notice: Subject to any disclaimer, the term of this patent is extended or adjusted under 35 U.S.C. 154(b) by 0 days.

(21) Appl. No.: 11/233,704

(22) Filed: Sep. 23, 2005

(65) Prior Publication Data

US 2006/0213968 A1 Sep. 28, 2006

Related U.S. Application Data

(60) Provisional application No. 60/664,188, filed on Mar. 23, 2005.

(51) Int. Cl.
*G06K 17/00* (2006.01)

(52) U.S. Cl. .................................................. 235/375

(58) Field of Classification Search ................ 235/375
See application file for complete search history.

(56) References Cited

U.S. PATENT DOCUMENTS

| | | | |
|---|---|---|---|
| 5,383,113 A | 1/1995 | Kight et al. |
| 5,577,109 A | 11/1996 | Stimson et al. |
| 5,903,830 A | 5/1999 | Joao et al. |
| 5,918,909 A | 7/1999 | Fiala et al. |
| 5,930,363 A | 7/1999 | Stanford et al. |
| 5,945,653 A | 8/1999 | Walker et al. |
| 5,956,700 A | 9/1999 | Landry |
| 5,991,748 A | 11/1999 | Taskett |
| 6,000,608 A | 12/1999 | Dorf |
| 6,012,049 A | 1/2000 | Kawan |
| 6,088,682 A | 7/2000 | Burke |
| 6,119,106 A | 9/2000 | Mersky et al. |

(Continued)

FOREIGN PATENT DOCUMENTS

EP 1 164 7777 A2 12/2001

(Continued)

OTHER PUBLICATIONS

European Search Report, Application No. 06111513.5-2414, Jun. 29, 2006, 10 pages.

*Primary Examiner*—Daniel Walsh
*Assistant Examiner*—Tae W Kim
(74) *Attorney, Agent, or Firm*—Hunton & Williams LLP (57) ABSTRACT

A system and method for adding value to a customer account are provided. An identifier associated with a value is distributed to a customer. The identifier is usable to add the value to an account. A request to add the value to a customer account is received via short message service (SMS). The request comprises the identifier and account identification information associated with the customer account. In some embodiments, the identifier may be entered into the device using text auto-completion software. The request is received from a user communication device as an SMS message. The value associated with the identifier and the customer account associated with the account identification number are identified based on the request. The value is caused to be added to the customer account. A confirmation that the value was added to the customer account is passed to the user communication device.

20 Claims, 2 Drawing Sheets

U.S. PATENT DOCUMENTS

| | | |
|---|---|---|
| 6,185,545 B1 | 2/2001 | Resnick et al. |
| 6,188,752 B1 | 2/2001 | Lesley |
| 6,189,787 B1 | 2/2001 | Dorf |
| 6,208,851 B1 | 3/2001 | Hanson |
| RE37,122 E | 4/2001 | Levine et al. |
| 6,282,566 B1 | 8/2001 | Lee, Jr. et al. |
| 6,285,749 B1 | 9/2001 | Manto |
| 6,311,170 B1 | 10/2001 | Embrey |
| 6,314,171 B1 | 11/2001 | Dowens |
| 6,315,206 B1 | 11/2001 | Hansen et al. |
| 6,330,544 B1 | 12/2001 | Walker et al. |
| 6,333,976 B2 | 12/2001 | Lesley |
| 6,375,073 B1 | 4/2002 | Aebi et al. |
| 6,424,706 B1 | 7/2002 | Katz et al. |
| 6,434,379 B1 | 8/2002 | Despres et al. |
| 6,445,780 B1 | 9/2002 | Rosset |
| 6,473,500 B1 | 10/2002 | Risafi et al. |
| 6,478,401 B1 | 11/2002 | King et al. |
| 6,494,367 B1 | 12/2002 | Zacharias |
| 6,507,644 B1 | 1/2003 | Henderson et al. |
| 6,529,593 B2 | 3/2003 | Nelson |
| 6,581,827 B2 | 6/2003 | Welton |
| 6,588,658 B1 | 7/2003 | Blank |
| 6,592,035 B2 | 7/2003 | Mandile |
| 6,648,222 B2 | 11/2003 | McDonald et al. |
| 6,745,022 B2 | 6/2004 | Knox |
| 6,805,289 B2 | 10/2004 | Noriega |
| 6,934,529 B2 | 8/2005 | Bagoren et al. |
| 7,086,584 B2 | 8/2006 | Stoutenburg et al. |
| 7,093,761 B2 * | 8/2006 | Smith et al. ............ 235/462.07 |
| 7,096,003 B2 | 8/2006 | Joao et al. |
| 7,131,582 B2 | 11/2006 | Welton |
| 7,243,839 B2 | 7/2007 | Beck et al. |
| 2001/0000808 A1 | 5/2001 | Lesley |
| 2001/0001321 A1 | 5/2001 | Resnick et al. |
| 2001/0023415 A1 | 9/2001 | Keil |
| 2001/0042784 A1 | 11/2001 | Fite et al. |
| 2002/0022966 A1 | 2/2002 | Hogan |
| 2002/0025797 A1 | 2/2002 | Joao et al. |
| 2002/0077076 A1 | 6/2002 | Suryanarayana et al. |
| 2002/0091573 A1 | 7/2002 | Hodes |
| 2002/0101966 A1 | 8/2002 | Nelson |
| 2002/0115424 A1 * | 8/2002 | Bagoren et al. ............ 455/408 |
| 2002/0119767 A1 | 8/2002 | Fieldhouse et al. |
| 2002/0133457 A1 | 9/2002 | Gerlach et al. |
| 2002/0165024 A1 * | 11/2002 | Puskala ..................... 463/40 |
| 2002/0174016 A1 | 11/2002 | Cuervo |
| 2003/0004889 A1 | 1/2003 | Fiala et al. |
| 2003/0171993 A1 | 9/2003 | Chappuis |
| 2003/0194988 A1 | 10/2003 | Knox |
| 2003/0200179 A1 | 10/2003 | Kwan |
| 2003/0218062 A1 | 11/2003 | Noriega et al. |
| 2004/0009760 A1 | 1/2004 | Laybourn et al. |
| 2004/0106418 A1 * | 6/2004 | Cini et al. .................. 455/466 |
| 2004/0218741 A1 | 11/2004 | Welton |
| 2004/0230536 A1 | 11/2004 | Fung |
| 2004/0267663 A1 | 12/2004 | Karns et al. |
| 2005/0071229 A1 | 3/2005 | Mashinsky et al. |
| 2005/0125288 A1 | 6/2005 | Fou |
| 2005/0127169 A1 | 6/2005 | Foss |
| 2005/0131815 A1 | 6/2005 | Fung et al. |
| 2005/0143051 A1 * | 6/2005 | Park ........................ 455/406 |
| 2005/0263587 A1 | 12/2005 | Martinez |
| 2006/0019634 A1 * | 1/2006 | Hawkes ..................... 455/411 |
| 2006/0023856 A1 | 2/2006 | Welton |
| 2006/0035632 A1 * | 2/2006 | Sorvari et al. ............... 455/418 |
| 2006/0041470 A1 * | 2/2006 | Filho et al. .................... 705/14 |
| 2006/0085335 A1 | 4/2006 | Crawford et al. |
| 2006/0100927 A1 | 5/2006 | Zormati |
| 2006/0161490 A1 | 7/2006 | Chakiris et al. |
| 2006/0163347 A1 | 7/2006 | Foss et al. |
| 2006/0213985 A1 | 9/2006 | Walker et al. |
| 2006/0255125 A1 | 11/2006 | Jennings et al. |
| 2006/0289621 A1 | 12/2006 | Foss et al. |
| 2007/0057045 A1 | 3/2007 | Beck et al. |
| 2007/0187490 A1 | 8/2007 | Feldman et al. |

FOREIGN PATENT DOCUMENTS

| | | |
|---|---|---|
| WO | WO 00/33264 | 6/2000 |
| WO | WO 01/22333 A1 | 3/2001 |

* cited by examiner

DELIVERY OF VALUE IDENTIFIERS USING SHORT MESSAGE SERVICE (SMS)

CROSS-REFERENCE TO RELATED APPLICATIONS

This application claims the benefit of U.S. Provisional Patent Application No. 60/664,188 filed Mar. 23, 2005.

FIELD OF THE INVENTION

This invention relates to the delivery of identifiers such as PINs from user devices to account providers such as telecommunication service providers.

BACKGROUND OF THE INVENTION

Communication devices and other electronic components, especially mobile telephones, are a very common consumer product. In many countries, a popular type of payment arrangement for service associated with a device (such as telecommunication service for a mobile telephone) is for the user to make payments to credit their account in advance of using the mobile telephone. This type of payment is commonly known as "pre-pay". The process of making a payment and crediting the user's account is commonly known as a "top-up", which term reflects the normal manner of usage in which the user frequently tops up their account by relatively small amounts. Many pre-pay systems allow the user to make payments at a variety of retail outlets, thereby allowing the user to pay for a top-up at a location which is convenient to them.

Conventional stored value accounts such as mobile telephone accounts are reloaded or "topped up" in a two-step process. First, the customer purchases at a retail outlet a stored value card having a PIN (e.g., of up to 16 or more letters and/or digits) associated with a specific value such as $20. Second, the customer accesses a central processor, e.g., by calling an 800 number on the back of the card, and requests to add the card's value to the customer's account. During the call, the customer typically provides card identification information such as a PIN as well as information sufficient to identify the customer's account, such as a phone number associated with the account and the name of the account provider. For instance, a customer attempting to add the card value to a wireless phone account may call an 800 number on the back of the card to access a centralized VRU. In response to various VRU prompts, the customer may input the card PIN, the name of the customer's service provider (such as AT&T), and the phone number corresponding to the wireless account. The central VRU system may then cause the card value to be added to the customer's wireless account.

Many of these cards are still printed, stored and transported by the Mobile Operators under highly secure conditions to the retailer or distributor as they are effectively active (i.e. useable and therefore valuable) as soon as they are printed. As the market has expanded, the logistical complexity of maintaining this process for such large numbers of transactions and the costs associated with managing the many opportunities for fraud and system abuse led the Network Operators to seek other alternatives. Often, no record is kept of where a card has been distributed, as the route to market is often quite elaborate. Some small stores buy cards at cash and carries, and few if any systems have been developed that can cancel all stolen cards. Lorries full of cards have been stolen; staff in stores have sold cards and pocketed the money themselves. Cards (or other physical embodiments of a PIN or other identifier) are often equivalent to money.

More recently electronic payment systems of crediting a mobile phone account have been developed. Some of these systems use magnetic stripe cards in which limited user details were contained within a magnetic stripe. In some recent systems, cards are distributed in an "inactive state" and activated at the point of sale ("POS").

Despite intense efforts by the mobile operators to promote an earlier electronic system, market acceptance has been slow. Cards have not reduced in popularity, it is simply that the cards are expensive for the mobile operators and have been encouraged to decline, and alternative systems are being promoted and made increasingly attractive.

Other systems enable customers to replenish prepaid mobile phone accounts by sending an SMS message to a centralized system. For instance, U.S. Application Publication No. 2002/0115424 to Bagoren discloses one such system. Other relevant systems includes those described in the following patents and applications: U.S. Pat. No. 6,375,073 to Aebi et al.; U.S. Pat. No. 6,070,067 to Nguyen et al.; and U.S. Patent Application Publication No. 2002/0187772 to Hyyppa et al. The disclosures of all references mentioned herein are incorporated herein by reference in their entireties.

There are several disadvantageous costs associated with many prior art systems and methods: a cost of IVR provisioning; a cost of Customer Services for high rate of fall-out from IVR (typing in a number consisting of 16 digits can be difficult and can involve error); cost of secure delivery; cost of wastage, loss, and theft; and a high cost for retailer to hold all denominations of all service providers. Also, the end-user may be unlikely to find the right denomination for the right operator at all merchants. Also, the process can be time-consuming for the customer.

In addition, many people do not like carrying yet more plastic cards. Most plastic cards are not transferable. In other words, a first user cannot top up a second user's account with the first user's card. The cards from many service providers do not have a phone number on them, so they can get mixed up. The unregistered cards are often used once and discarded. As they are plastic, they are more expensive than the cards they replace.

It is desirable to provide an improved system and method for adding value to a stored-value account.

SUMMARY OF THE INVENTION

Accordingly, various embodiments of the invention are directed to a system and method for adding value to a customer account. An identifier associated with a value is distributed to a customer. The identifier is usable to add the value to an account. A request to add the value to a customer account is received via short message service (SMS). The request comprises the identifier and account identification information associated with the customer account. The request is received from a user communication device as an SMS message. The value associated with the identifier and the customer account associated with the account identification number are identified based on the request. The value is caused to be added to the customer account. A confirmation that the value was added to the customer account is passed to the user communication device.

According to one embodiment, an identifier associated with a value is distributed to a customer, wherein the identifier is usable to add the value to an account. A request to add value to a customer account is received via short message service (SMS), wherein the request comprises the identifier and an identification number associated with the customer account. The request is received from a user communication device. The value associated with the identifier is identified. The value is caused to be added to the customer account.

According to another embodiment, a system for distributing an identifier associated with a value to a customer is provided, wherein the identifier is usable to add the value to the account. An input device receives via short message service (SMS) a request to add the value to a customer account. The request comprises the identifier and account identification information associated with the customer account. The request is received from a user communication device as an SMS message. A processor identifies the value associated with the identifier and the customer account associated with the account identification information based on the request. A value insertion system causes the value to be added to the customer account. An output device passes to the user communication device a confirmation that the value was added to the customer account.

According to another embodiment, a method for adding value to a customer account is provided. An identifier associated with a prepaid value is received at a second user communication device associated with a customer account from a first user communication device. A request to add the value to the customer account is passed to a central processor. The request to add value comprises the identifier and account identification information associated with the customer account. The request to add value is passed via SMS. The central processor is configured to identify the value and the customer account based on the request.

DETAILED DESCRIPTION OF EXEMPLARY EMBODIMENT(S)

Various embodiments of the present invention are directed to a system for adding value to a customer account. In some embodiments, a wireless communication device may send a value identifier via short message service ("SMS") to a centralized redemption processing system. For instance, the user may enter a PIN on a phone keypad of a mobile phone configured to send SMS messages. The communication may contain information sufficient to identify a customer account. For instance, the wireless communication device may be a phone associated with the account, wherein the phone number of the wireless device is encoded in the message and is sufficient to identify the account. The centralized system may then cause the value associated with the identifier to be added to the identified account.

In some embodiments, the centralized system may identify the account based on the communication. For instance, the centralized system may identify the account based on a phone number in the communication.

In some embodiments, the account may be managed by the centralized system. In other embodiments, the account may be managed by a separate account provider system. In embodiments where the account is managed by a separate system, the centralized system may cause the value to be inserted into the user's account, e.g., in any manner as described herein or in the patent applications referenced herein.

In some embodiments, the centralized system may enable adding value associated with a PIN to a prepaid account. For instance, a customer having a pay-as-you-go wireless mobile phone service account may purchase a $20 prepaid phone card PIN in order to "top off" or recharge the airtime minutes in the account. The prepaid card comprises a PIN and a phone number. In prior art systems, the customer would redeem the card value by calling the phone number and then providing the PIN and account number at IVR prompts. The centralized system may enable the customer to send the PIN in an SMS communication (i.e. text message) to the phone number. For mobile phone customers who send a PIN from their respective mobile phone, the account number (i.e., mobile phone number) need not be provided in the text of the message because it may be identified via an SMS header or caller ID mechanism. For other accounts, the customer may also include an account number in the text of the message. Once the service provider system identifies the PIN and account number based on the SMS message, the PIN's value may be identified and added to the designated account using traditional methods. Thus, a customer may add value to an account by sending a simple SMS text message instead of navigating a two-way phone call.

In some embodiments, the centralized system may send a transaction confirmation back to a user communication device (e.g., a mobile phone that initiated a request to add value), e.g., via SMS. For instance, a confirmation may be sent via SMS to indicate that a request to add value was successfully received. In some embodiments, a confirmation may be sent to indicate that the request was passed to the proper account management system. In some embodiments, a confirmation may be sent to the user's communication device to indicate that the value was successfully added to the customer's account.

In some embodiments, the centralized system may enable the use of an auto-spelling phone dictionary software in mobile phones, such as T9 or Zi, to simplify the process of entering the text of a PIN on a phone keypad. For instance, by using PINs based on real words, the auto-spelling dictionary may auto-complete a word comprised in the PIN. For instance, for a PIN based on the word "kitchen," such as "kitchen123," the phone may auto-complete the word "kitchen" after the user enters the letters "k-i-t-c."

Some embodiments of the present invention relate to payment systems and methods that may allow consumers to make payments at retail locations, e.g., payments for value to be added to a customer account. Some embodiments relate to the use of technical means to facilitate such transactions. While some embodiments relate specifically to payments for crediting an account associated with a device such as a mobile telephone, these and other embodiments may also be more generally applicable to payment for other products and services.

Various embodiments of the present invention may be used in conjunction with existing systems. For instance, value may be added to an account via any embodiment disclosed herein, and value may be added to the same account using conventional systems. In one conventional system, a magnetic stripe card payment system may involve the distribution of cards bearing a card identifier such as a PAN (of up to 19 or more digits). A customer may place a call to an IVR system and enter the PAN on the mobile phone (or other device) for validation of the card and for linking this card to the mobile phone's airtime account. Thereafter the magnetic stripe may be read when payment is made by swiping the card through a reader in a retail outlet to identify the mobile telephone account.

Accordingly, some embodiments of the present invention provide for systems and methods wherein users pass value identifiers (such as a prepaid card PIN) to a central system (or provider system, such as a system of a telecommunications service provider) via short message service (SMS). The SMS message may comprise the PIN (or other identifier).

In some embodiments, the central system may identify the account. For instance, the central system may identify the account if an SMS message is sent from a device that automatically communicates information identifying the account. For instance, the central system may identify a phone number of a mobile phone that sent the SMS message, wherein the phone number is associated with an account. In some embodiments, such as in circumstances where an account cannot otherwise be identified from the SMS communication, the SMS message may also comprise an account number associated with a product or service.

Although many embodiments are described herein in reference to mobile phones, mobile phone accounts, mobile phone service providers, PINs, and prepaid cards, it should be appreciated that the systems and methods described herein may apply to any communication device (e.g., any communication device equipped to send text messages), any account related to a product or service, any provider of a product or service, any identifier associated with a value, and any representation of the identifier (e.g., physical or electronic).

Figure 1:
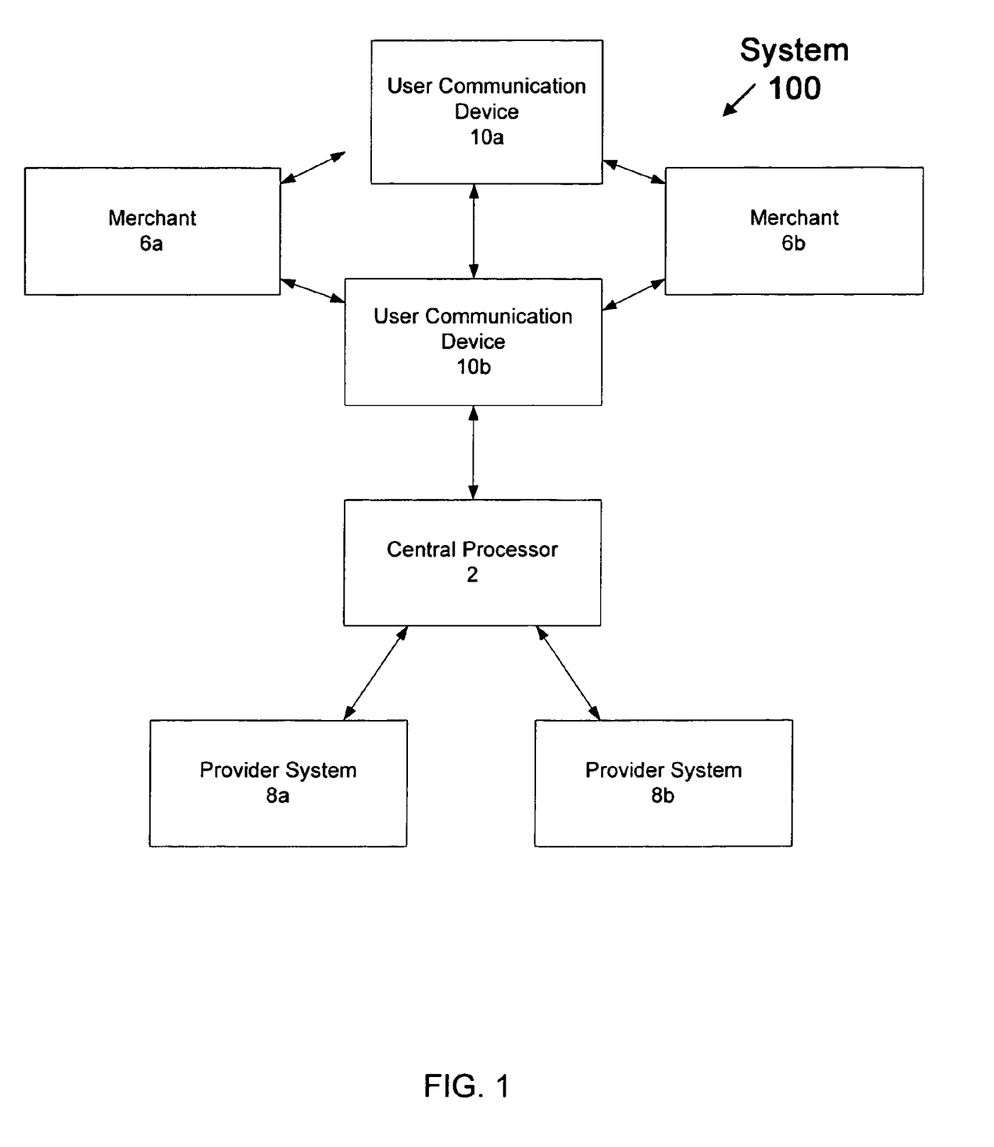
FIG. 1 shows a system for passing an identifier using short message service.

FIG. 1 shows a system for passing an identifier using short message service. As shown in FIG. 1, the system may comprise one or more user communication devices 10a-10b, a central processor 2, one or more provider systems 8a-8b, and one or more merchants 6a-6b. One or more merchants 6a-6b may distribute identifiers (e.g., card having identifiers associated with a value) to one or more customers. For instance, the identifiers may be distributed at a point of sale using a point of sale terminal, e.g., by swiping a magnetic stripe of a stored value card having a printed identifier associated with a value (which in some embodiments may be selected at the point of sale).

The central processor 2 may comprise any computer, server, database system, or other system. The provider systems 8 or central processor 2 may manage customer accounts. Like central processor 2, the provider systems may also comprise any computer, server, database system, or other system.

The user communication device 10 may comprise any device that enables electronic communication (e.g., SMS text messaging) between a user and another entity. For instance, the user communication device 10 may comprise a wireless handset or portable Internet-enabled video game player. The user communication device 10 may be equipped with a keypad and other functionality.

A customer may send an SMS message from a user communication device 10a to one or more other user communication devices 10b or to a central processor 2. The SMS message may comprise a request to add the associated value to a customer account. The request may comprise the identifier as well as account identification information of the customer account (e.g., a phone number corresponding to a telecommunications service account) as well as information identifying the provider of the account (such as the telecommunications service provider).

The user communication devices 10 may also be equipped with software and hardware to enable voice recognition and automatic spelling and dictionary functionality with respect to entering the identifier and/or the identification information into the message. For instance, a user communication device 10 may store a variety of different user account numbers wherein each account number may be entered by pressing a single button (or combination of buttons), without entering the whole account number. In these instances, the phone or other user communication device 10 may store the account numbers so that users do not have to remember them.

Embodiments of the present invention may comprise an alternative payment system and method that involves the use of technical means that may be similar to or different from those described above, e.g., to effect payment for crediting an account.

Some embodiments are directed to a system for crediting an account (such as a mobile phone account) using some or all of the following components:

(1) A mobile phone having a radio communication circuit and a keyboard capable of keying numbers and/or letters of the alphabet and the ability to use the Short Message Service text system provided by the Mobile Operator telecommunications networks (or other centralized system or provider system);

(2) A card purchased from a retail outlet (or over the Internet or other communications network) containing a PIN (or other identifier) comprising alphabetic and/or numeric characters (e.g., and a telephone number for the service);

(3) A transaction control system (or other central system, such as the central system mentioned above) remote from the mobile phone (or other device), the mobile phone and the transaction control system able to communicate using the SMS text messaging facility, the transaction control system storing PIN database records wherein each PIN has a related denomination stored against it.

(4) An airtime account control system (or other central system) run by the Mobile Operator (or other central entity), the airtime account control system and the transaction control system being remote and being capable of communicating over a communications link, the airtime account control system storing account database records of mobile phone accounts, each account database record including an amount of credit (or other value).

Figure 2:
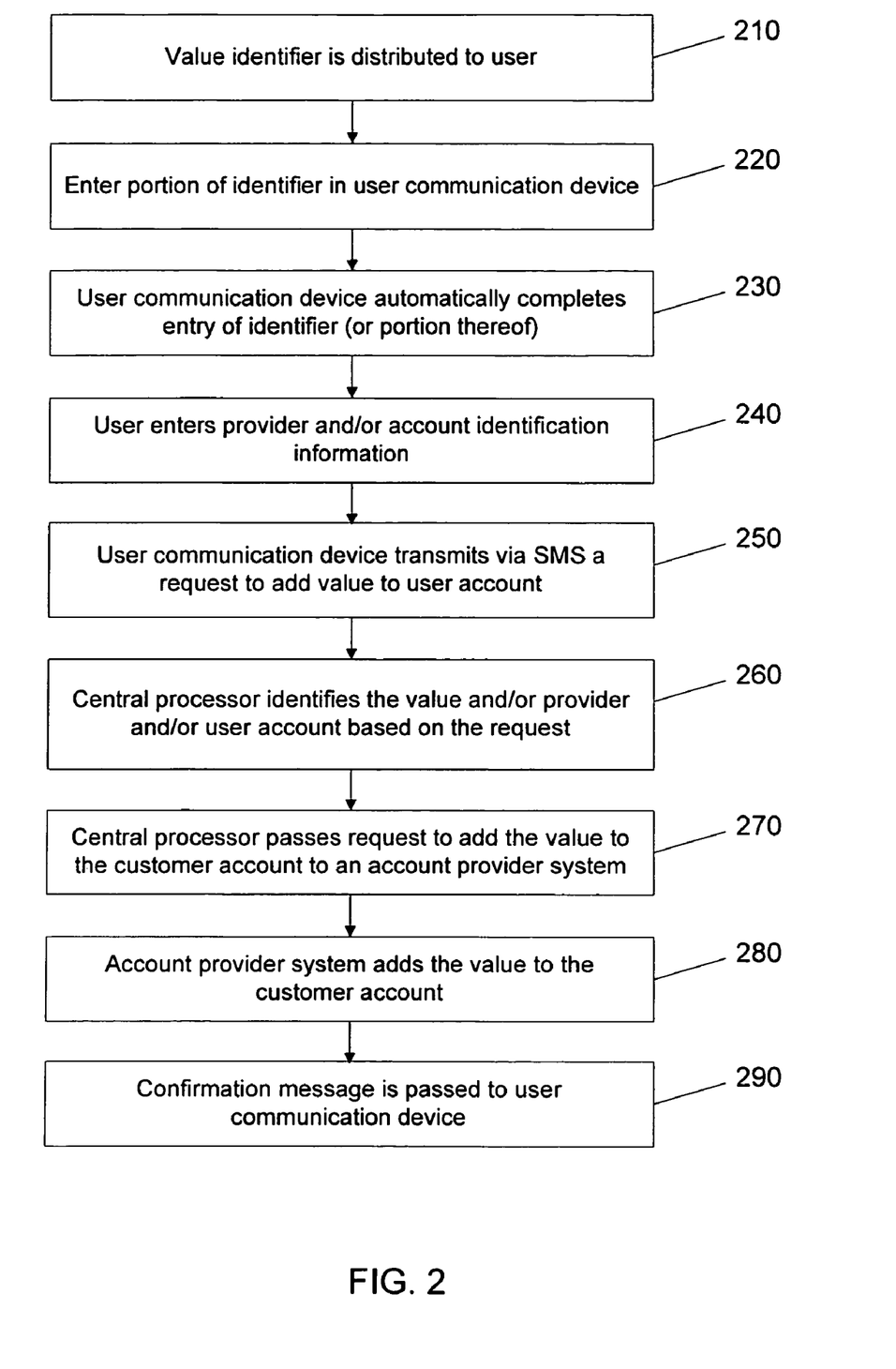
FIG. 2 depicts a flowchart showing a method for passing an identifier using short message service.

FIG. 2 depicts a flowchart showing a method for passing an identifier using short message service.

In block 210, a value identifier may be distributed to a user. For instance, the user may purchase a prepaid phone card having a PIN. In some embodiments, the user may purchase an amount of value at a point-of-sale, and the point-of-sale may distribute a coupon or voucher having a PIN or other code representative of the purchase value. In some embodiments, the user may receive the identifier via mail, email, SMS, or other communication (e.g., as a reward for a prior purchase or other activity). Any methods of obtaining an identifier associated with value are contemplated herein.

By way of example, a user may purchase a stored value card having an associated value of $50 with the printed PIN "15243CANDLE." For instance, the PIN "15243CANDLE" may be usable to add $50 of value to an account.

In block 220, a portion of the identifier may be entered into a user communication device such as a wireless phone. The identifier (or portion thereof) may be provided to a user communication device as part of an SMS message. For instance, the user may elect to compose an SMS text message and then begin to enter a PIN associated with purchased value.

For instance, the user may enter the letters "C-A-N-D" into the keypad of a wireless phone. (It should be appreciated that the number keypad of a phone can be used to enter letters and symbols as well as numbers. For instance, pressing the number "3" two times in rapid succession can be used to enter the letter "E".)

In block 230, the user device may automatically complete the identifier (or portion thereof).

For instance, upon entry of the first one or more letters of a PIN or other code (or portion thereof) into a user device, the user device may implement auto-complete functions. For instance, upon entering the letters "C-A-N-D" (e.g., via voice recognition or on a keypad such as a computer keyboard or phone keypad), the user device may automatically complete the word "CANDLE" by automatically entering the remaining letters "L-E." The user may delete the auto-completed letters or otherwise undo the auto-completion by using a backspace, delete function, voice command, or other similar functionality. In some embodiments, the user device may suggest possible auto-completed words that can be selected by the user. For instance, after entry of "C-A-N-D," the user device may suggest the words "CANDY," "CANDIES," and "CANDLE." The user may then select the intended word (here, "CANDLE"). In this way, text entry (e.g., on a phone keypad) can be expedited and simplified.

It should be appreciated that the PIN may be entered in any variety of ways. For instance, the user device may have voice recognition software (or other similar functionality) to recognize and/or identify spoken letters, words, numbers, and symbols (such as the characters of a PIN). For instance, a user may enter a PIN into a user device (e.g., a microphone comprised in the device) by speaking each of the letters, numbers, and symbols of a PIN or other code. The user device may convert each of the spoken characters into text (e.g., text displayed on a screen of the user device.) For instance, if the PIN is "15243CANDLE," then the user may speak each character in series, e.g., "1-5-2-4-3-C-A-N-D-L-E." In some embodiments, voice recognition software may also enable recognition of entire spoken words. Thus, for the above example, the user may speak "1-5-2-4-3-CANDLE," wherein the digits are spoken in succession while the word "candle" is pronounced as a single word. Combinations of spoken and written letters, words, numbers, symbols, and other characters are also contemplated herein. For instance, the user may enter the digits "1-5-2-4-3" on a keypad and then speak the word "candle" or speak each letter "C-A-N-D-L-E." The user might also speak each of the numbers "1-5-2-4-3" and then enter the letters "C-A-N-D-L-E."

In block 240, provider and/or account identification information may be entered into the user device. For instance, the user may speak the name of the company (such as AT&T) that provides telecommunications service for the user's mobile phone or other user device. This company or other entity may be the provider of the account to which the user may want to add value. The user may also enter an account number or other account identifier, such as the phone number of the mobile telephone account for which value is to be added. Alternately, another number associated with the account may be provided instead of a phone number, e.g., for accounts that do not involve a phone and for accounts that have an account number separate from the mobile telephone number. For instance, these numbers may be spoken or entered at the user communication device.

In some embodiments, account identification information may be entered (or otherwise provided) automatically or with minimal user input. For instance, the phone number of a user communication device may be automatically transmitted in (or with) any SMS message transmitted from the user communication device, e.g., as source information related to the SMS message. Alternately, the phone number (or other account identifier) may be stored in the user communication device (or on a communications network to which the user communication is connected), and the stored number (or code) may be inserted automatically with a simple click of a button (or combination of buttons). For instance, the user may store a fifteen-digit account number as a speed-dial number in an internal (or networked) database. Instead of entering the entire account number manually for each request to add value to the account, the user may simply speed-dial the number to cause it to be entered into the text message. In some embodiments, the user device may have memory comprising a "phone book" (stored locally on the user device or externally on a communication network or other database or storage). Account numbers, PINs, and other information may be stored in the "phone book" (or other storage system) just like any other number or code. This may enable the user to enter these numbers into the SMS message (or attach them to the message) directly from the phone book without having to manually or verbally enter the individual characters of the account number or PIN, etc.

Mobile telephones and other mobile communication devices may also have m-wallet functionality, which may be used in conjunction with the features and functions described herein. For instance, a user may add credit cards, passwords, and other account identifiers to a database stored on the communication device (or a central processor in communication with the communication device) for use in transactions.

In some embodiments, a customer may enter customer account identification information that is not related to the user communication device. For instance, the customer may enter on an SMS-enabled wireless phone (or personal computer) the number of a bank account, utility account, online merchant account, or other account to which the customer wants to add the value.

It should be appreciated that the SMS message may comprise any other information sufficient to identify the account, such as the name, address, or code associated with a provider of the account (e.g., the name of the bank or utility). This information may be necessary so that the central processor may cause the value associated with the identifier to be added to the proper customer account.

In block 250, the user device may transmit via SMS a request to add the value associated with the identifier to the user account. The SMS message may comprise a PIN, account identification information, and/or account provider identification information. For instance, the SMS message may comprise the inputs entered into the user input device as described in blocks 210-240.

Continuing with the example described above, the SMS message may comprise the PIN "15243CANDLE" and may include the phone number (or other SMS identifier) of the user communication device from which the SMS message originates. For example, the phone number may be comprised in the formatting (e.g., the header) of the message rather than the body of the message. In some embodiments, the PIN, account identifier, and account provider may be identified in the message (e.g., in the body of the message). For example, the message body may comprise a PIN ("15243CANDLE") followed by a phone number (e.g., 2025551234) followed by an account provider (e.g., "AT&T" or a numerical code associated with the provider). The message may conform to predetermined formatting specifications, such as formatting instructions provided on a purchased stored value card. For instance, a single space may separate the PIN from the account identification information in the text message.

The request may be passed to a central processor or other entity.

In block 260, the central processor may receive the request. Based on the received SMS message, the central processor may identify the value, account information (e.g., account identification information), and/or provider identification information (e.g., the identity of the provider. For instance, the central processor may identify the PIN from the body of the text, and the central processor may identify the account identification information (such as a phone number) from the header or other formatting information of the SMS message.

The central processor may identify a value associated with the identifier by looking up the identifier in a database of identifiers, each associated with a value. For instance, in the case of stored value cards with a predetermined value that are distributed to customers, each PIN identifier printed on a card may be associated with a specific predetermined value prior to distributing the cards. In other embodiments, the customer may assign a selectable value to a particular PIN. For instance, a particular PIN or card number may be assigned a value selected by the customer at the time the customer purchases the value. In those embodiments, the value may be associated with the specific value at the point of sale and stored in a database operatively connected to the central processor. The central processor may accordingly process information in the database to determine the value that corresponds to the identified PIN or other code.

In some embodiments, the central processor may also identify account identification information, such as a phone number of the requesting user communication device. In some embodiments, the central processor may process the body or formatting information to determine the account identification information. Like the PIN and value information, account information may be stored in and retrieved from a database. For instance, an account database may associate each of a plurality of user accounts with account identification information (such as a phone number of a user communication device).

In some embodiments, the central processing system may manage the customer account for which value is requested to be added. In these embodiments, the central processor may cause the value to be added to the account, e.g., by amending a database entry corresponding to the account.

In block 270, the central processor may pass to a provider system a request to add the value to the customer account. For instance, if the customer's account is managed by a third-party account provider (e.g., a carrier of telecommunications service or a public utility), then the request may be passed to this entity so that it can add the value to the account. The request may comprise any request as described or referenced herein. For instance, the request may comprise a request to "insert value" into the customer's account, as described in one of the applications incorporated by reference.

It should be understood that the actions described for block 270 may be unnecessary if the central processor manages the customer's account.

In block 280, the account provider system may add the value to the customer account. Again, it should be noted that the account provider may be the same or different entity than the central processor.

In block 290, a confirmation message may be passed to the originating user communication device. For instance, if a user communication device originates the request to add value, then a confirmation may be passed to this device, e.g., via SMS. Any type of confirmation may be passed. For instance, a confirmation of any of the following may be passed to the user device or otherwise communicated to the user: a confirmation that the request was received; a confirmation of the amount of value requested; a confirmation that the request was passed to the relevant provider; a confirmation that the value was successfully added to the account; an updated account balance; and other confirmation information. It should also be appreciated that the request process may comprise one or more verification steps. For instance, upon receiving a request to add value, the central processor may send a reply SMS message identifying the account (or the name of the requestor or other information associated with the request) and requesting confirmation to proceed with the transaction (e.g., by pressing "OK" on a phone keypad, and/or sending a reply SMS message containing the number "1" or another code indicating confirmation).

Various modifications and deviations from the method described herein are also within the purview of the invention. For instance, it should be appreciated that the identifier may be distributed to one customer but then received from another customer. For instance, the identifier may be distributed to one customer, who then gives it (e.g., transmits it via SMS) to another customer. The second customer may then request to add the value associated with the identifier to an account of the second customer (or a third customer). The identifier may be passed to any number of different users before it is redeemed.

It should also be appreciated that the request to add value may be received from a person different from the holder of the target account. For instance, a parent may purchase value and send an SMS message requesting to add purchased value to a child's (or friend's) account. In some embodiments, a request to add value may be processed regardless of the source of the request as long as the identifier and account identification information correspond to valid value identifiers and customer accounts.

Other methods of implementing various embodiments of the invention may comprise some or all of the following actions:

(1) Keying in the alphabetic PIN (or other identifier) from a purchased card (or other physical or virtual representation of a value identifier) onto the mobile phone (or other communication device) using the keyboard (or input device) of the mobile phone (or other device);

(2) Sending this alphabetic PIN as an SMS text message to the phone number for the product or service as specified on the card (or other representation of a value identifier);

(3) The data read by the transaction control system corresponding to a PIN record in the database and from this record extracting the denomination of the purchased card;

(4) The transaction control system communicating with the airtime account control system and requesting of it to update the mobile phone's account by the denomination of the purchased card (or other value associated with the identifier);

(5) Returning an SMS text message to the mobile phone confirming the success or otherwise of the top-up (or other transaction wherein value is added or otherwise credited to an account).

Various features of the present invention as applied to crediting an account for a mobile phone may be generalized to any other products or services. For instance, instead of maintaining and updating account database records, appropriate means for delivering the product or service in question are provided. The manner of delivery will depend on the product in question, but includes generating an order for a supplier to supply a product, communication of data to instruct a service provider to provide a service, or where a product is intangible and represented by database records, updating that database record. In order for a consumer to invoke the purchase of products or services other than an airtime credit, the alpha-numeric code of the product or service may be included in the SMS short message as well as the PIN of the card purchased.

According to another aspect of some embodiments of the invention, systems and methods of purchasing general services may be provided. These systems and methods may involve any or all of the following:

(1) A mobile phone having a radio communication circuit, a keyboard capable of keying numbers and letters of the alphabet and the ability to use the Short Message Service text system provided by the Mobile Operator telecommunications networks;

(2) A card purchased from a retail outlet containing a PIN comprising alphabetic characters only and a telephone number for the service;

(3) A transaction control system remote from the mobile phone, the mobile phone and the transaction control system able to communicate using the SMS text messaging facility, the transaction control system storing PIN database records wherein each PIN has a related denomination stored against it;

(4) A service fulfillment account control system run by a service fulfillment company, the service fulfillment account control system and the transaction control system being remote and being capable of communicating over a communications link, the service fulfillment control system storing details of products and services in a common database or databases and each product or service has a value recorded against it in its database record Any methods may be used, such as those involving any or all of the following:

(1) Keying in a variable length alphanumeric product or service identifier and the alphabetic PIN from the card onto the mobile phone using the keyboard of the mobile phone;

(2) Sending this identifier and alphabetic PIN as an SMS text message to the phone number for the service as specified on the card;

(3) The data read by the transaction control system corresponding to a PIN record in the database and from this record extracting the denomination of the card;

(4) Communicating the product or service identifier from the data read and the value of the PIN and the consumer's mobile phone number to the service fulfillment account control system;

(5) The data read by the service fulfillment account control system corresponds to a record in the service fulfillment account control system's database and this record identifies the product or service being requested and its value;

(7) Beginning the process of fulfilling the order identified from the read data by delivering the product or service to the consumer identified by their mobile phone number;

(8) Confirming back to the transaction control system that the transaction has been successful;

(9) Returning a confirmation SMS text message to the mobile phone

When applied to payments for products in general, some embodiments of the present invention may provide the same advantages as described above with reference to crediting an account for a mobile phone. The present invention is particularly useful in that it provides a mechanism of allowing consumers to pay for a product at any of a large number of retail locations, but without the retailer needing to be involved in the delivery of the product. For instance, instead of delivering a product (or service) at a point-of-sale (POS), a merchant may merely deliver a PIN associated with the product or service (e.g., by delivering a virtual or physical representation of the PIN, such as a card). For instance, the customer may purchase a card comprising the PIN. The customer may later contact a central entity in order to redeem the product or service.

The method of payment at the retailer by the consumer for the card that contains the PIN may be by any accepted means supported by the retailer. The cards may appear as any other product to the retailer. Each card may have a unique number (e.g., a European Article Number, serial number, barcode, number encoded on a magnetic stripe). For instance, the number may be presented as a barcode exactly as all other products for sale. This barcode may be read by the retailer's terminal equipment and the correct payment amount may be indicated and requested.

According to another aspect of some embodiments of the invention, there is provided a mechanism whereby the PIN, which for the crediting of a mobile phone's service account (e.g., airtime account) alone may have a specific value and may be communicated between consumers using any or all of the following, for example:

(1) A first mobile phone having a radio communication circuit, a keyboard capable of keying numbers and letters of the alphabet and the ability to use the Short Message Service text system provided by the Mobile Operator telecommunications networks;

(2) A card purchased from a retail outlet containing a PIN comprising alphabetic characters only and a telephone number for the service;

(3) A second mobile phone having a radio communication circuit, a keyboard capable of keying numbers and letters of the alphabet and the ability to use the Short Message Service text system provided by the Mobile Operator telecommunications networks Any methods may be used, such as methods involving any or all of the following:

(1) Keying in the alphabetic PIN from the card onto the first mobile phone using the keyboard of the mobile phone;

(2) Sending this alphabetic PIN as an SMS text message to the second mobile phone;

(3) The second mobile phone sending this same alphabetic PIN as an SMS text message to the phone number for the service as specified on the card;

(4) The data read by the transaction control system corresponding to a PIN record in the database and from this record extracting the denomination of the card;

(5) The transaction control system communicating with the airtime account control system and requesting of it to update the second mobile phone's account by the amount identified by the PIN;

(6) Returning a confirmation SMS text message to the mobile phone.

The various features of the present invention as applied in the third aspect above to crediting an account for a mobile phone may be generalized to any other products as described above.

According to another aspect of the present invention, there is provided a mechanism whereby the PIN on a card purchased from a retailer may be used in the purchase of goods and services through the web, or via other routes which may otherwise involve the use of credit or debit cards or other payment mechanisms that imply that the consumer has a bank or equivalent account. In some embodiments, the PIN may first be converted into a standard transaction card identifier, such as a Visa card number. For example, a customer may access a website (e.g., a website identified on the card or a website of the merchant who sold the card) and enter the PIN. The website may receive the PIN, identify the value, purchase a stored value card for a corresponding value, and then send the card number (and other authorization information) to the customer, e.g., via the website or in an email. In another embodiment, e-tailers may employ special payment functionality so that PINs can be used in place of credit cards and other traditional payment methods.

Some embodiments of the invention may comprise any of the following:

(1) A mobile phone having a radio communication circuit, a keyboard capable of keying numbers and letters of the alphabet and the ability to use the Short Message Service text system provided by the Mobile Operator telecommunications networks;

(2) A card purchased from a retail outlet containing a PIN and a telephone number for the service;

(3) A transaction control system remote from the mobile phone, the mobile phone and the transaction control system able to communicate using the SMS text messaging facility, the transaction control system storing PIN database records wherein each PIN record has a denomination stored in it;

(4) An airtime account control system run by the Mobile Operator, the airtime account control system and the transaction control system being remote and being capable of communicating over a communications link, the airtime account control system storing account database records of mobile phone accounts, each account database record including an amount of credit.

Some embodiments may comprise any of the following:

(1) Purchasing a card from a retailer and using the retailer's system to accept payment as for other goods;

(2) Keying in the PIN from this purchased card onto the mobile phone using the keyboard of the mobile phone;

(3) Sending this PIN as an SMS text message to the phone number for the service as specified on the card;

(4) The data read by the transaction control system corresponding to a PIN record in the database and from this record extracting the denomination of the card;

(5) The transaction control system communicating with the airtime account control system and requesting of it to update the mobile phone's account by the amount identified by the PIN;

(6) Returning a confirmation SMS text message to the mobile phone.

The entry of PINs may be simplified by using a wholly alphabetic PIN. Such a PIN may be less than the length of the equivalent numeric PIN (e.g., less than half the length) and yet have the same number of possible values, since there are 26 letters and only 10 digits.

In some embodiments, PIN entry may be simplified by using PINs made of words from the T9 dictionary (or other dictionaries such as auto-spelling dictionaries).

The PIN on the card may be constructed wholly from one or more words found in an automatic word spelling dictionary present in mobile phones or other communication devices. This then simplifies the keying in of PINs by using such dictionaries as T9 and Zi.

According to some embodiments, IVR and voice recognition may be used for systems for PIN input on voice calls.

The alphabetic or word based PIN may be provided to the system by the customer talking into the system by means of a voice recognition system based on an Interactive Voice Response service.

In some embodiments, one user may send text to one another (via SMS) and thereby electronically transfer card values to one another. For instance, a user may send a prepaid card PIN to another user (such as a family member or friend). The other user may use the PIN to obtain the associated product or service.

According to some embodiments, a user may key in a card PIN onto a mobile phone using the keyboard of the mobile phone and send this PIN by SMS text message to another mobile phone. The recipient may then send this SMS text message on to yet another mobile phone. This process may repeat any number of times.

The final recipient mobile phone may send the PIN as an SMS text message to the central system (e.g., a central phone number) for the service as specified on the card.

The value of the cards may be controlled or monitored by batch or POS activation. For instance, whenever cards are swiped at a retail location, a central processing entity may activate the card.

Some embodiments may include any or all of the following:

(1) A mobile phone having a radio communication circuit, a keyboard capable of keying numbers and letters of the alphabet and the ability to use the Short Message Service text system provided by the Mobile Operator telecommunications networks;

(2) A transaction control system remote from the mobile phone, the mobile phone and the transaction control system able to communicate using the SMS text messaging facility, the transaction control system storing PIN database records wherein each PIN record has a denomination stored in it;

(3) Combining known cards into batches of one or more card;

(4) Identifying these batches of cards by unique batch identifiers and recording these batches in a database forming a part of the transaction control system whose records contain a status identifier for each of these batches;

(5) Recording all the PINs of all the cards contained in the batch in the batch database record;

(6) Issuing these batches of cards to retailers with a status of "inactive" wherein every card is therefore inactive;

(7) Activating one batch at a time by the retailer communicating with the transaction control system, identifying the batch by means of its unique batch identifier and requesting that the status be changed to "active" wherein every card in the batch becomes active; a process termed "activation";

Some embodiments may comprise any or all of the following:

(1) Purchasing a card from a retailer and using the retailer's system to accept payment as for other goods;

(2) Keying in the PIN from this purchased card onto the mobile phone using the keyboard of the mobile phone;

(3) Sending this PIN as an SMS text message to the phone number for the service as specified on the card;

(4) The data read by the transaction control system corresponding to a PIN record in the database and from this record extracting the denomination and the status of the card;

(5) Returning a rejection SMS text message to the mobile phone if the status of the card is found to be inactive;

(6) The transaction control system communicating with the airtime account control system and requesting of it to update the mobile phone's account by the amount identified by the PIN if the status of the card is found to be active;

(7) Returning a confirmation SMS text message to the mobile phone.

In some embodiments, the value may determined by the amount paid for it by the customer. For instance, the customer may specify a certain value to be activated on the card, according to any systems and methods known in the art.

The retailer may be charged for the value of the cards following activation.

Some embodiments of the invention may provide a card based airtime top-up service that may not need any PINs provided by the Mobile Operators.

In some embodiments, an IVR may not be needed for adding PIN value to an account.

In some embodiments, a card purchased to perform an airtime top-up can be used equally by account holders of any Mobile Operator (or other product or service provider).

In some embodiments, entities (such as third parties) may place advertising on the cards (or other representation of an identifier).

In some embodiments, PINs may be used for the purchase of goods and services other than those related to mobile airtime.

In some embodiments, PINs may be used as payment for goods and services. For instance, the PIN may be used as a card number in a transaction similar to that used for credit and debit cards at merchant terminals or over the Internet.

The application of air-time credit to a mobile phone may be achieved by the end-user sending a free standard text message of a service identifier (typically 5 characters) and an 8 character alphabetic PIN to an SMS host; a process with which the vast majority of Pre-Pay users are very familiar, and whose success rate may be significantly higher than IVR.

In some embodiments the absence of the service identifier may indicate that the value is to be added to the user's airtime account. In some embodiments the user may determine the functionality of one or more service identifiers.

Card PINs may be provided by a centralized system. The end-user may send one or more PINs to the centralized system, which may construct from an interpretation of the text an electronic top-up to the end-user's mobile operator.

One benefit of the present invention is that providers of products and services (such as those that may be associated with a PIN) may use electronic distribution and redemption channels that do not necessarily involve the distribution to a consumer (or reception from a consumer) of a physical embodiment of a PIN (e.g., on a physical card). For instance, a top-up may be entirely electronic.

Cards and accounts may be activated in a variety of ways: in units of a batch at the point of sale by using an IVR (or web) based activation service; or in units of a card, again at the point of sale, but by swiping the card through the acquisition or POS terminal. Value associated with identifiers may also be activated and/or credited in any other ways known in the art, such as any of those described in the following U.S. patents and patent applications: U.S. application Ser. No. 10/778,338 filed Feb. 17, 2004, U.S. application Ser. No. 10/253,243 filed Sep. 24, 2002, U.S. Provisional Application No. 60/324,333 filed Sep. 24, 2001, U.S. Provisional Application No. 60/396,404 filed Jul. 15, 2002, U.S. Provisional Application No. 60/519,630 filed on Nov. 14, 2003, U.S. Provisional Application No. 60/519,629 filed on Nov. 14, 2003, U.S. application Ser. No. 10/712,182 filed Nov. 13, 2003, U.S. application Ser. No. 10/655,828 filed Sep. 5, 2003, U.S. patent application Ser. No. 10/698,084 filed Nov. 3, 2003, U.S. application Ser. No. 10/411,971 filed Apr. 11, 2003, U.S. application Ser. No. 09/641,363 filed Aug. 18, 2000 (now issued as U.S. Pat. No. 6,575,361), U.S. Provisional Application No. 60/149,740 filed Aug. 19, 1999, U.S. application Ser. No. 10/732,641 filed Dec. 10, 2003, the U.S. application Ser. No. 10/739,301 filed Dec. 19, 2003, and the U.S. patent application Ser. No. 10/758,429 filed Jan. 16, 2004. All of these patents and applications are incorporated herein by reference in their entirety. Other features of these patents and applications are also contemplated herein. It should be appreciated that the authorization and activation of media devices as described herein may be combined with the novel systems and methods of the applications referenced above.

It should be appreciated that the embodiments described above may have some or all of the features described for that embodiments. For each system component or step described above, a corresponding system and method according to the invention may comprise only a portion of the component or step.

In some embodiments, the cards may only have value following activation offering the industry very significant control benefits and minimizing financial risk to the retailer.

In some embodiments, the cards may only be charged after activation, offering much improved cost controls over existing services.

In some embodiments, the operators can significantly reduce or even close their IVR services. In some embodiments, the operators can significantly reduce their Customer Services support provision.

In some embodiments, the nature of the service also enables a single generic card to be used for all networks, ensuring availability of stock and providing greater flexibility in card use.

According to some embodiments, a customer may designate a service provider. A small number of cards, e.g., 3 cards with denominations of $5, $10, $20, could be in circulation instead of a larger number of cards for each denomination for a plurality of different service providers. A customer may purchase a single card and later select the service provider (or select the service provider at the point of sale).

It should be understood that the identifiers are not limited to the purchase of airtime. They may be used, unchanged and with the same end-user interface, to purchase other services such as mobile services (text bundles, ring-tones, screen savers, games and so on) and non-mobile services (WiFi time, web purchases, lottery tickets, etc). As contemplated herein, the identifiers may be used to add or activate any type of value in any type of customer account. For instance, any of the products and/or services mentioned in commonly-owned U.S. application Ser. No. 10/732,641 filed Dec. 10, 2003, are contemplated herein. The disclosure of this application is incorporated herein by reference in its entirety.

In some embodiments, one or more cards and identifiers may be transferable as gifts. For instance, an identifier may be passed from one user device to another user's device. The transferee may then use the identifier to redeem value in the same or similar manner as that described herein.

In some embodiments, the identifiers may be service-independent such that the PIN may be used in other financial transactions. In some embodiments, identifiers may be used with any network, such as a closed or open debit or credit network.

In some embodiments, because the manufacture and distribution of cards may be outside the control of the mobile operators, additional branding and marketing opportunities are possible. For example cards themed for Christmas and other occasions, special editions, prizes and so on, or Starbucks or McDonald's branded cards become a possibility. Cards may be branded with an entity other than (or in addition to) the provider of the card.

Using text as the mechanism for transferring the PIN to the airtime service. In some embodiments, "own label" PINs can be used to remove the need for anything of value from the Mobile Operators in the whole process. In some embodiments, Mobile Operators may be unaware of a voucher until the top-up occurs.

Some PINs/identifiers may redeemable for the purchase of age-related goods and services (such as lotteries, and goods/services related to younger children such as entry to theme parks, etc.). Adult content may also be purchased. Merchants may perform any necessary age checking at the point of purchase. Redemption of these clearly marked PINs would be restricted according to their intended use.

The embodiments of the present inventions are not to be limited in scope by the specific embodiments described herein. For example, although many of the embodiments disclosed herein have been described with reference to stored value cards and wireless phone accounts, the principles herein are equally applicable to any other type of value identifier or indicia and any other type of account. Also, although many of the embodiments have been described in reference to "topping up" an account, the principles herein are equally applicable to other systems and methods of adding or activating value in an account. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What we claim is:

1. A method for adding value to a customer account, comprising:
    distributing to a merchant an identifier associated with a value for distribution to a customer, the identifier being redeemable with a plurality of providers, including a specific provider, the identifier also being usable to add the value to an account associated with a first communication device, the account being with the specific provider;
    receiving at a central processor a request to activate the identifier from the merchant, the request resulting from a purchase of the identifier;
    activating the identifier at the central processor and sending an activation notification to the merchant;
    receiving at the central processor a request via short message service (SMS) to add the value to the account associated with the first communication device, the request being received from a specific communication device, the request being input by a user of the specific communication device, wherein the specific communication device may be the first communication device, and wherein the specific communication device facilitates insertion of value into the account associated with the first communication device, the request comprising:
        the identifier associated with the value; and
        account identification information associated with the account associated with the first communication device,
    wherein body of the SMS message comprises the account identification information;
    passing to the specific communication device a SMS message to confirm that the request was received and to verify that the value will be added to the account associated with the first communication device;
    upon receiving a confirmation message at the central processor from the specific communication device verifying the account, identifying at the central processor the value associated with the identifier based on the request;
    identifying at the central processor the specific provider and the account associated with the first communications device based on the SMS message;
    causing the value to be added to the account; and
    passing to the first communication device a confirmation that the value was added to the account.

2. The method of claim 1, wherein, prior to receiving the request from the specific communication device, the identifier is input into the SMS message at the communication device at least in part by a user and at least in part automatically by the communication device.

3. The method of claim 1, wherein the identifier comprises at least one first set of alpha-numeric characters and at least one second set of alpha-numeric characters, and wherein the communication device is configured to automatically input the second set of alpha-numeric characters in response to receiving an input of the first set of alpha-numeric characters.

4. The method of claim 1, wherein at least a portion of the identifier is entered into the SMS message at the communication device using an auto-complete spelling function of a dictionary software program operative on the communication device.

5. The method of claim 1, wherein the identifier comprises a first portion and a second portion, wherein the first portion is entered into the SMS message into the communication device, and in response to entering the first portion into the communication device, the communication device automatically enters the second portion.

6. The method of claim 1, wherein the identifier comprises a first portion and a second portion, wherein the first portion is entered into the SMS message into the communication device, and in response to entering the first portion into the communication device, the communication device automatically suggests the second portion.

7. The method of claim 1, wherein a first portion of the identifier comprises a series of alpha-numeric characters, and wherein the first portion of the identifier is entered at the communication device by speaking each of the series of alpha-numeric characters.

8. The method of claim 1, wherein a first portion of the identifier comprises a series of alpha-numeric characters, and wherein the first portion of the identifier is entered at the communication device by speaking each of the alpha-numeric characters of the first portion of the identifier.

9. The method of claim 1, wherein a first portion of the identifier is entered at the communication device by verbal request, and wherein a second portion of the identifier is entered at the communication device by manually entering one or more alpha-numeric characters comprised in the second portion.

10. The method of claim 1, wherein, prior to receiving the request from the communication device, the identifier is keyed into the SMS message at the communication device by a user.

11. The method of claim 1, wherein the body of the SMS message comprises the identifier.

12. The method of claim 1, wherein the account identification information is stored in a memory storage system comprised in the communication device, and wherein the account identification information is entered into the body of the SMS message directly from the memory storage system.

13. The method of claim 1, wherein the identifier comprises a PIN.

14. The method of claim 1, wherein the communication device comprises a wireless phone having a phone number, and wherein the account identification information comprises the phone number.

15. The method of claim 1, wherein the account comprises a telecommunications service account.

16. The method of claim 1, wherein the account comprises a prepaid wireless telephone account.

17. The method of claim 1, wherein the account is usable to purchase online gaming service.

18. The method of claim 1, wherein the account is usable to purchase bridge or road toll service.

19. The method of claim 1, wherein the account is usable to enable one or more services on the first communication device.

20. A system for adding value to a customer account, comprising:

a distribution system for distributing an identifier associated with a value to a customer, the identifier being redeemable with a plurality of providers, including a specific provider, the identifier also being usable to add the value to an account associated with a first communication device, the account being with the specific provider;

an input device for:
receiving a request to activate the identifier from the distribution system, the request resulting from a purchase of the identifier; and
receiving a request via short message service (SMS) to add the value to the account associated with the first communication device, the request being received from a specific communication device, the request being input by a user of the specific communication device, wherein the specific communication device may be the first communication device, and wherein the specific communication device facilitates insertion of value into the account associated with the first communication device, the request-comprising:
the identifier associated with the value; and
account identification information associated with the account associated with the first communication device,
wherein body of the SMS message comprises the account identification information;

a processor for:
activating the identifier and sending an activation notification to the distribution system;
upon receiving a confirmation message from the specific communication device verifying the account, identifying the value associated with the identifier based on the request; and
identifying the specific provider and the account associated with the first communications device based on the SMS message;

a value insertion system for causing the value to be added to the account; and an output device for:
passing to the specific communication device a SMS message to confirm that the request was received and to verify that the value will be added to the account associated with the first communication device; and
passing to the first communication device a confirmation that the value was added to the account.

* * * * *